United States Patent
Rezvani et al.

(10) Patent No.: US 7,092,412 B1
(45) Date of Patent: Aug. 15, 2006

(54) METHOD AND APPARATUS FOR LONG HAUL HIGH SPEED DATA TRANSMISSION OVER XDSL PSEUDO CHANNELS

(75) Inventors: Behrooz Rezvani, Pleasanton, CA (US); Rouben Toumani, San Jose, CA (US); Sushil Agrawal, Cupertino, CA (US)

(73) Assignee: Ikanos Communications, Inc., Fremont, CA (US)

( * ) Notice: Subject to any disclaimer, the term of this patent is extended or adjusted under 35 U.S.C. 154(b) by 631 days.

(21) Appl. No.: 09/859,182

(22) Filed: May 14, 2001

Related U.S. Application Data (60) Provisional application No. 60/203,807, filed on May 12, 2000.

(51) Int. Cl.
- H04J 3/04 (2006.01)
- H04L 12/66 (2006.01)
- G01R 31/08 (2006.01)

(52) U.S. Cl. .............. 370/536; 370/463; 370/235; 375/219

(58) Field of Classification Search .......... 370/535, 370/536, 463, 401, 235, 537, 538, 468
See application file for complete search history.

(56) References Cited

U.S. PATENT DOCUMENTS

| | | | |
|---|---|---|---|
| 5,875,192 A | | 2/1999 | Cam |
| 5,905,781 A | * | 5/1999 | McHale et al. .......... 379/93.14 |
| 6,002,670 A | * | 12/1999 | Rahman et al. ............ 370/238 |
| 6,005,873 A | * | 12/1999 | Amit ........................ 370/494 |
| 6,021,158 A | * | 2/2000 | Schurr et al. ............... 375/211 |

(Continued)

OTHER PUBLICATIONS

Richard Cam et al., Inverse Multiplexing for ATM (IMA) Specification Version 1.1, Mar. 1999, The ATM Forum Technical Committee pp. 1-25.

Primary Examiner—Alpus H. Hsu
Assistant Examiner—Steven Blount
(74) Attorney, Agent, or Firm—IP Creators; Charles C Cary (57) ABSTRACT

A method and apparatus for extending existing fiber and local area networks across digital subscriber lines, at matching data rates is disclosed. A DSL transceiver system is disclosed with one or more gateways coupled to at least one digital signal processor (DSP). The DSP in turn couples to a plurality of analog-front-ends (AFE's). Each AFE is coupled via associated hybrid front ends (HFE's) to corresponding subscriber lines. The transceiver or a controller coupled thereto maintains a table of bandwidth requirements and frame types for a variety of sessions. Individual sessions include bandwidth requirements beyond existing XDSL capabilities. The system determines frametype, e.g. 802 and bandwidth requirements, e.g. 100 Mbps for each session and allocates more than one subscriber line accordingly. For each session the divergent bandwidth availability of each of the subscriber lines to which the DSP may be coupled is determined and all or a portion of that bandwidth is allocated to the selected session. Provisioning continues until the allocated bandwidth on each subscriber line equals the session requirements. Next, a pseudo channel identifier is allocated to each physical channel. This along with a session number which is assigned to each pseudo channel allows packet based demultiplexing of a single session across a plurality of subscriber lines. A sequence for processing of pseudo channels is then assigned to all the pseudo channels within each session. This information is then communicated to the remote end and a corresponding provisioning takes place.

6 Claims, 9 Drawing Sheets

U.S. PATENT DOCUMENTS

| | | | |
|---|---|---|---|
| 6,084,885 A * | 7/2000 | Scott | 370/455 |
| 6,310,894 B1 * | 10/2001 | Counterman | 370/484 |
| 6,404,861 B1 * | 6/2002 | Cohen et al. | 379/93.01 |
| 6,452,942 B1 * | 9/2002 | Lemieux | 370/468 |
| 6,480,487 B1 * | 11/2002 | Wegleitner et al. | 370/354 |
| 6,499,061 B1 * | 12/2002 | Benayoun et al. | 709/245 |
| 6,501,770 B1 * | 12/2002 | Arsenault et al. | 370/477 |
| 6,580,727 B1 * | 6/2003 | Yim et al. | 370/463 |
| 6,618,374 B1 * | 9/2003 | Buckland et al. | 370/394 |
| 6,775,305 B1 * | 8/2004 | Delvaux | 370/535 |
| 6,781,985 B1 * | 8/2004 | Feder et al. | 370/376 |
| 6,801,539 B1 * | 10/2004 | Rives | 370/466 |

* cited by examiner

| Resource | Channel | | Session | Sequence # | Protocol | Status | Frame Type | Data Rate Up Mb/s | Data Rate Dn Mb/s |
|---|---|---|---|---|---|---|---|---|---|
| | Physical | Pseudo | | | | | | | |
| AFE$_1$ | 1 | L$_{20}$ | 1 | 1 | VDSL | Run | 802 | ... | ... |
| | 2 | L$_{30}$ | 2 | 1 | ADSL | ... | ATM | ... | ... |
| | 3 | L$_{31}$ | 2 | 2 | ADSL | Run | ATM | ... | ... |
| | | | | | | | | Total | Total |
| AFE$_2$ | 1 | L$_{21}$ | 1 | 2 | VDSL | Run | 802 | ... | ... |
| | 2 | L$_{22}$ | 1 | 4 | VDSL | ... | 802 | ... | ... |
| | 3 | L$_{23}$ | 1 | 3 | VDSL | Run | 802 | ... | ... |
| | | | | | | | | Total | Total |

Global Allocation 400
402, 404, 406, 408, 410, 412, 414, 416, 418, 420

METHOD AND APPARATUS FOR LONG HAUL HIGH SPEED DATA TRANSMISSION OVER XDSL PSEUDO CHANNELS

CROSS REFERENCE TO RELATED APPLICATION

This application claims the benefit of prior filed co-pending Provisional Application No. 60/203,807 entitled "Long Haul 100 Base-T transmission over CAT-5 and CAT-3 cable" and filed on May 12, 2000 which is incorporated herein by reference in its entirety.

BACKGROUND OF THE INVENTION

1. Field of Invention

This invention relates generally to communications, and more particularly, to a method and apparatus for provisioning digital subscriber line (XDSL) communications for selected sessions including a plurality of pseudo channels.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as xDSL have been developed to increase the effective bandwidth of existing subscriber line connections, without requiring the installation of new fiber optic cable. An XDSL modem operates at frequencies higher than the voiceband frequencies, thus an xDSL modem may operate simultaneously with a voiceband modem or a telephone conversation.

Currently there are over ten discrete xDSL standards, including: G.Lite, ADSL, VDSL, SDSL, MDSL, RADSL, HDSL, etc. Within each standard there are at least two possible line codes, or modulation protocols, discrete multitone (DMT) and carrierless AM/PM (CAP). A typical DMT system utilizes a transmitter inverse fast Fourier transform (IFFT) and a receiver fast Fourier transform (FFT). The following patents are related to DMT modems: U.S. Pat. No. 5,400,322 relates to bit allocation in the multicarrier channels; U.S. Pat. No. 5,479,447 relates to bandwidth optimization; U.S. Pat. No. 5,317,596 relates to echo cancellation; and U.S. Pat. No. 5,285,474 relates to equalizers. The following patents are related to CAP modems: U.S. Pat. No. 4,944,492 relates to multidimensional passband transmission; U.S. Pat. No. 4,682,358 relates to echo cancellation; and U.S. Pat. No. 5,052,000 relates to equalizers. Each of these patents is incorporated by reference as if fully set forth herein.

XDSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop.

Modems using CAP or DMT or other line codes, essentially have three hardware sections: (a) an analog front end (AFE) to convert the analog signals on the subscriber line into digital signals and convert digital signals for transmission on the subscriber line into analog signals, (b) digital signal processing (DSP) circuitry to convert the digital signals into an information bitstream and optionally provide error correction, echo cancellation, and line equalization, and (c) a host interface between the information bitstream and its source/destination. Typically all of these components are located on a highly integrated single line card with a dedicated connection between one or more AFE's and a DSP.

Each installation represents a sizeable expense in hardware and service labor to provision the central office. The expense may not always be amortized over a sufficient period of time due the relentless introduction of new and faster xDSL standards each of which pushes the performance boundaries of the subscriber line in the direction of increasing bandwidth and signal integrity. As each new standard involves, line cards must typically be replaced to upgrade the service.

What is needed is a less rigid signal processing architecture that supports scalability of resources, and allows a more flexible hardware response to existing and evolving XDSL standards.

SUMMARY OF THE INVENTION

The present invention advantageously provides a method and apparatus for extending existing fiber and local area networks across digital subscriber lines, at matching data rates. The method and apparatus also allows data transport in any of a number of popular packet structure types including but not limited to: 802.X, ATM, etc. A DSL transceiver system is disclosed with one or more gateways coupled to at least one digital signal processor (DSP). The DSP in turn couples to a plurality of analog-front-ends (AFE's). Each AFE is coupled via associated hybrid front ends (HFE's) to corresponding subscriber lines. The transceiver or a controller coupled thereto maintains a table of bandwidth requirements and frame types for a variety of sessions. In the embodiment shown individual sessions include bandwidth requirements beyond existing XDSL capabilities. The system determines frame type, e.g. 802 and bandwidth requirements, e.g. 100 Mbps for each session and allocates more than one subscriber line accordingly. For each session the divergent bandwidth availability of each of the subscriber lines to which the DSP may be coupled is determined and all or a portion of that bandwidth is allocated to the selected session. Provisioning continues until the allocated bandwidth on each subscriber line equals the session requirements. Next, a pseudo channel identifier is allocated to each physical channel. This along with a session number which is assigned to each pseudo channel allows packet based demultiplexing of a single session across a plurality of subscriber lines. A sequence for processing of pseudo channels is then assigned to all the pseudo channels within each session. This information is then communicated to the remote end and a corresponding provisioning takes place. During run-time framing and demultiplexing across multiple subscriber lines allocated to the session takes place on the transmit path. On the receive path multiplexing and de-framing takes place. The system supports multiple frame types, multiple XDSL line codes and protocols.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention advantageously provides a method and apparatus for extending existing fiber and local area networks across digital subscriber lines, at matching data rates. The method and apparatus also allows data transport in any of a number of popular packet structure types including but not limited to: 802.X, ATM, etc. A DSL transceiver system is disclosed with one or more gateways coupled to at least one digital signal processor (DSP). The DSP in turn couples to a plurality of analog-front-ends (AFE's). Each AFE is coupled via associated hybrid front ends (HFE's) to corresponding subscriber lines. The transceiver or a controller coupled thereto maintains a table of bandwidth requirements and frame types for a variety of sessions. In the embodiment shown individual sessions include bandwidth requirements beyond existing XDSL capabilities. The system determines frametype, e.g. 802 and bandwidth requirements, e.g. 100 Mbps for each session and allocates more than one subscriber line accordingly. For each session the divergent bandwidth availability of each of the subscriber lines to which the DSP may be coupled is determined and all or a portion of that bandwidth is allocated to the selected session. Provisioning continues until the allocated bandwidth on each subscriber line equals the session requirements. Next, a pseudo channel identifier is allocated to each physical channel. This along with a session number which is assigned to each pseudo channel allows packet based demultiplexing of a single session across a plurality of subscriber lines. A sequence for processing of pseudo channels is then assigned to all the pseudo channels within each session. This information is then communicated to the remote end and a corresponding provisioning takes place. During run-time framing and demultiplexing across multiple subscriber lines allocated to the session takes place on the transmit path. On the receive path multiplexing and de-framing takes place. The system supports multiple frame types, multiple XDSL line codes and protocols.

The present invention provides a signal processing architecture that supports scalability of CO/DLC/ONU resources, and allows a significantly more flexible hardware response to the evolving XDSL standards without over committing of hardware resources. As standards evolve hardware may be reconfigured to support the new standards.

Figure 1A:
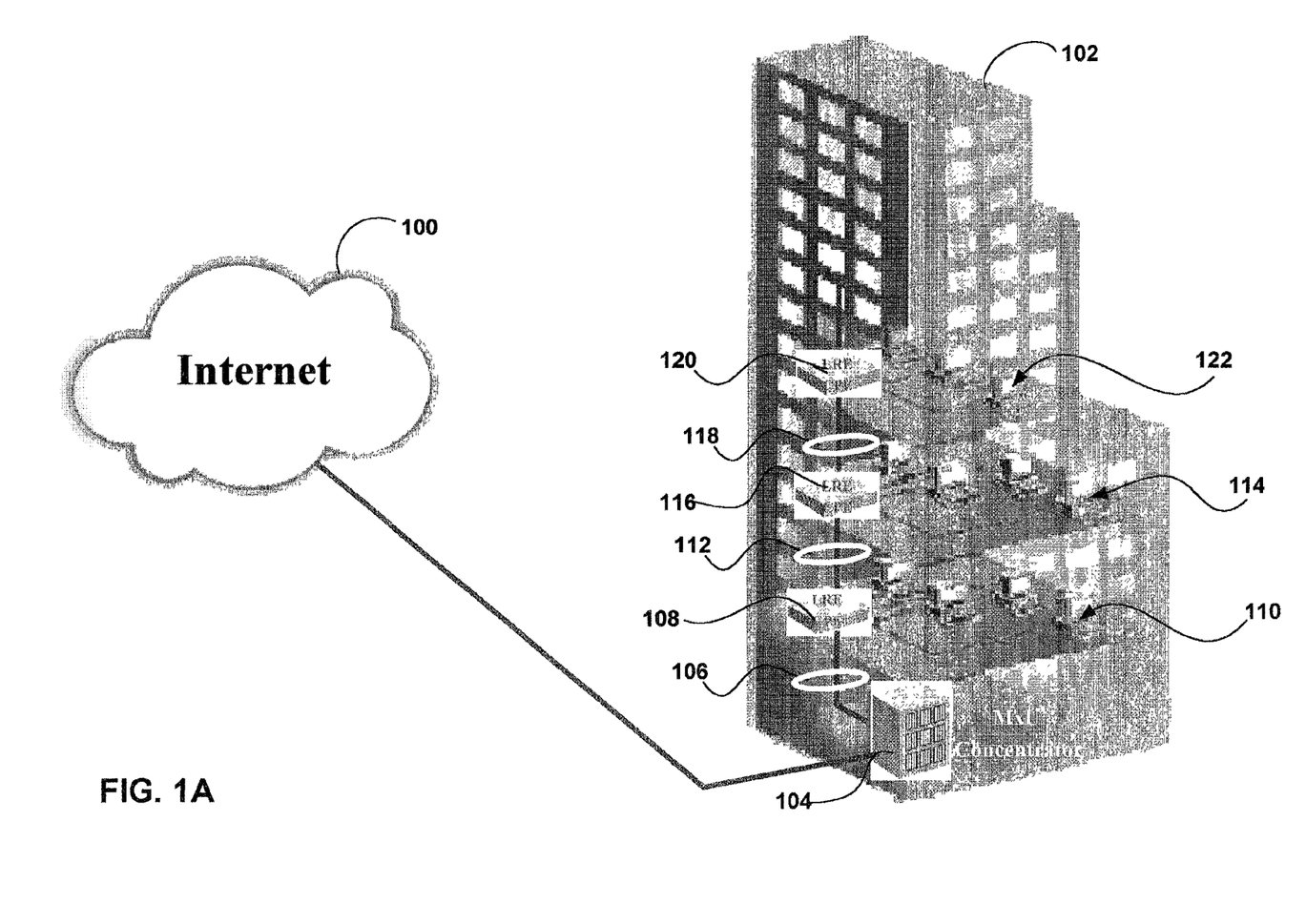
FIGS. 1A–C depict various practical applications for the current invention including: provisioning a multi tenant unit (MXU), provisioning fiber ring extension, and provisioning fiber to the curb (FTTC).
Figure 1B:
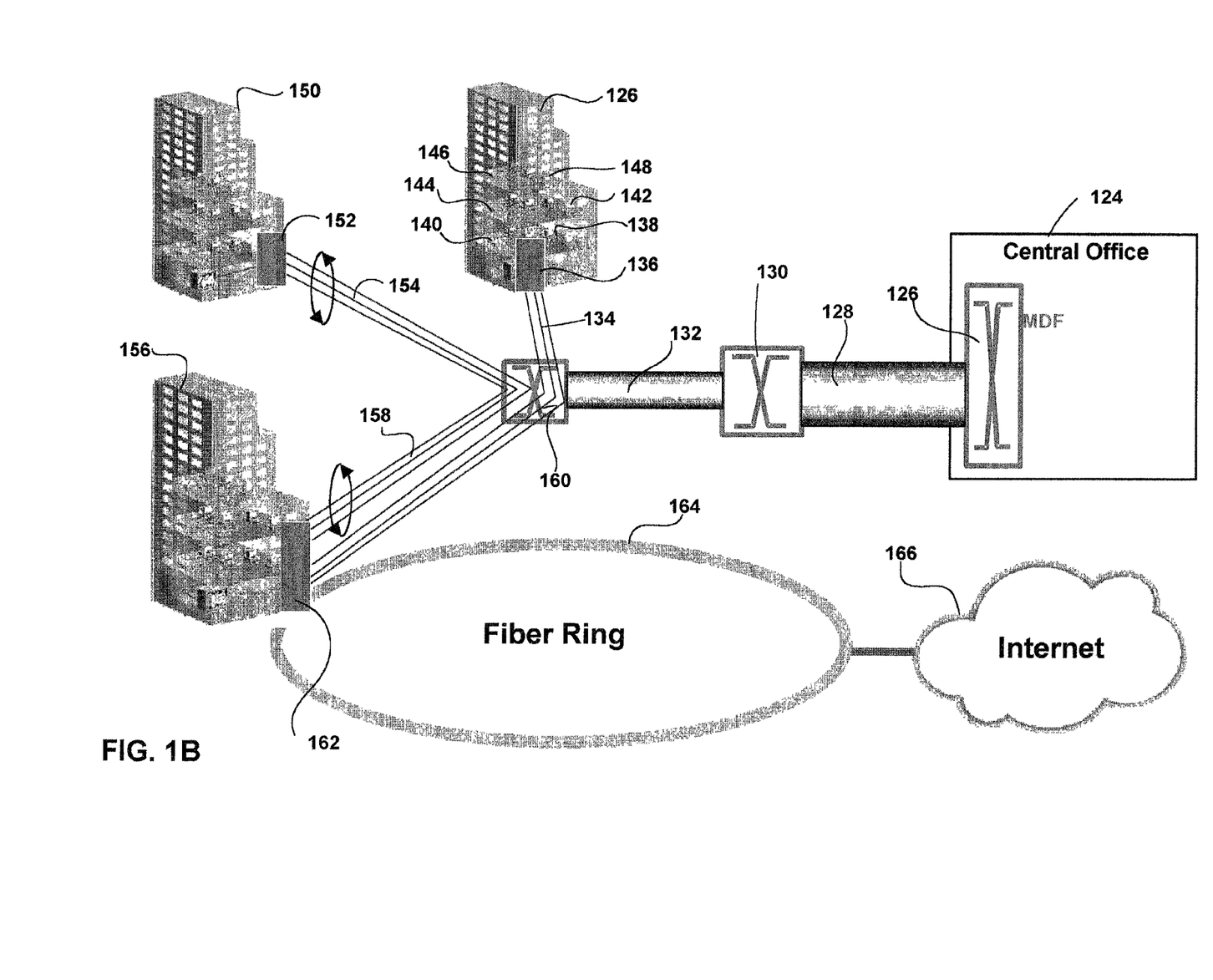
Figure 1C:
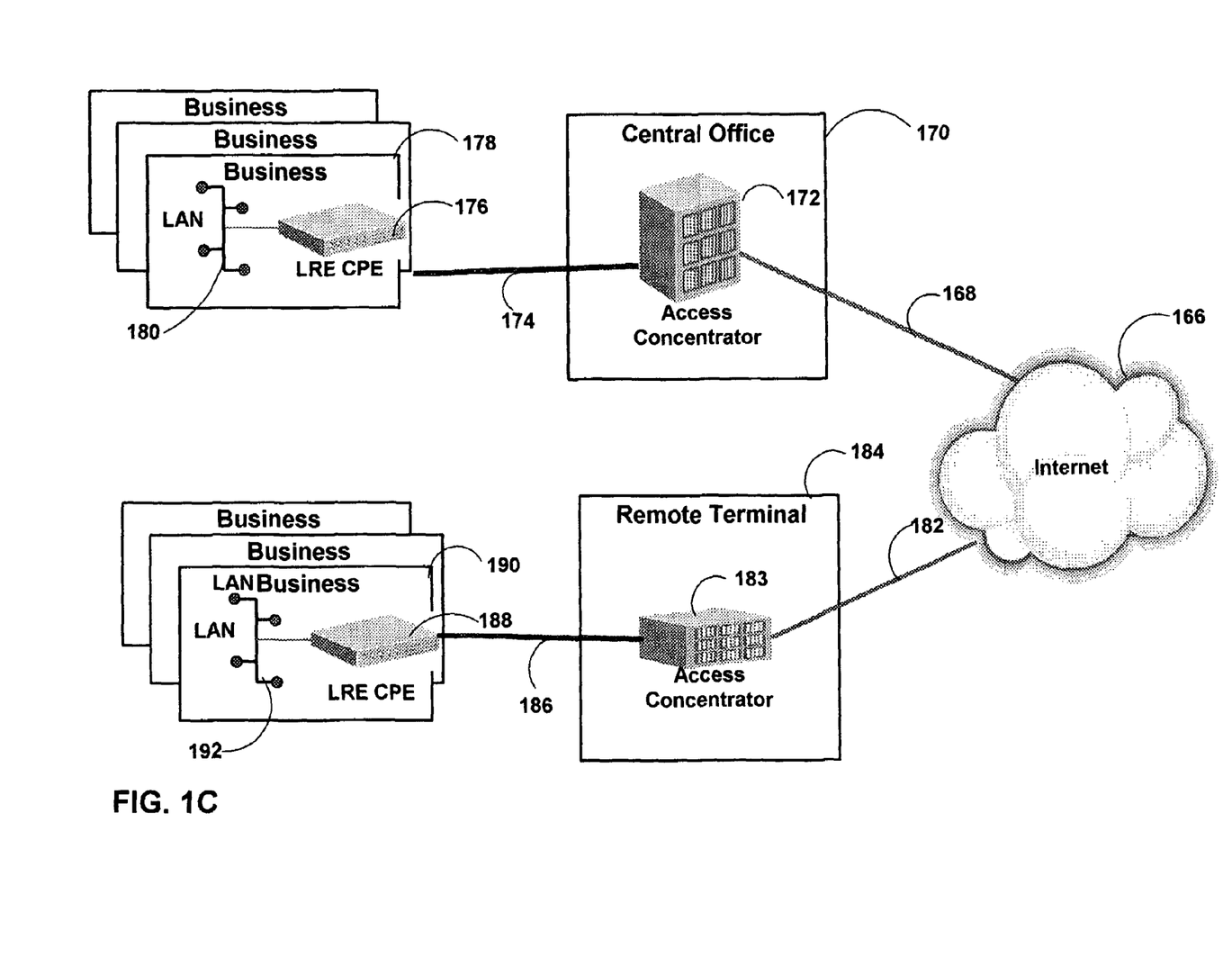

FIGS. 1A–C depict various practical applications for the current invention including: provisioning a multi tenant unit (MXU), provisioning fiber ring extension, and provisioning fiber to the curb (FTTC).

FIG. 1A shows high speed Internet 100 access to individual businesses in the high rise building 102. MxU Concentrator 104, deployed in the basement of the building is connected to LRE (Long Reach Ethernet) CPEs (Consumer Premises Equipments) 108, 116 and 120 on different subscriber's premises. The high speed data access is provided via groups of twisted copper pairs 106, 112 and 118. LRE CPEs distribute data to the workstations 110, 114 and 122.

Individual businesses in the high rise building subscribe to the Internet services. The service provider provisions the LRE CPE and the corresponding transceivers for the required capacity. As per the provisions, the transceivers on the line card in the MxU Concentrator and the transceivers on the LRE CPE gather the resources and establish a data link to provide the required Internet access to the subscriber.

FIG. 1B shows high speed Internet 166 access to individual businesses in the high rise building 156 located on the fiber ring 164 and also to businesses in the high rise buildings 126 and 150 located away from the fiber ring. Fiber Extension Concentrators 152, 136 and 162, deployed in the basement of the buildings are connected to LRE CPEs 140, 144 and 146 on different subscriber's premises. The fiber ring is extended to the buildings away from the ring via groups of twisted copper pairs 158, 154 and 134 passing through the cross-connects 160. LRE CPEs distribute data to the workstations 138, 142 and 148. The main distribution frame (MDF) 126 in the Central Office 124 is connected to cross-connects 130 and 160 via copper binder 128 and 132.

The goal here is to extend the fiber ring to the buildings which are away from the fiber. This is achieved by the DataXpress transceivers on the line cards in the fiber extension concentrators via groups of twisted copper pairs. Once the fiber ring is extended to the basement of the building, high speed internet data access can be provided to the subscribers in the building as explained above for FIG. 1A.

FIG. 1C shows high speed Internet 166 access to business 178 in the vicinity of a Central Office 170 or to a business 190 in the vicinity of a Remote Terminal 184. DataXpress transceivers are part of line cards in the Access Concentrators 172 of the Central Office or 183 of the Remote Terminal. Access Concentrator is connected to LRE CPEs 176 and 188 on different subscriber's premises. The high speed data access between the WAN and the Central Office or the Remote Terminal is provided via optical fiber links 168 and 182. Data access from the Central Office or the Remote Terminal to the LRE CPEs is provided via groups of twisted copper pairs 174 and 186. LRE CPEs distribute data to the individual workstations via LANs 180 and 192.

Figure 2:
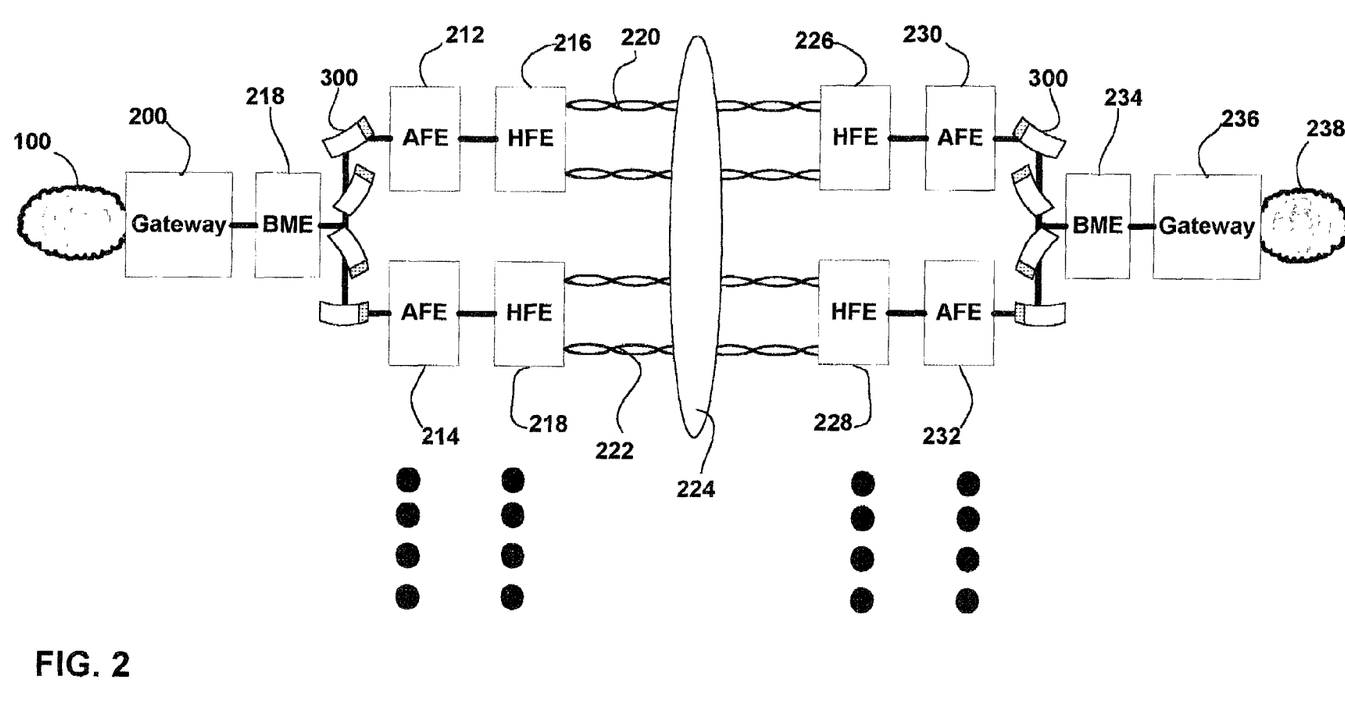
FIG. 2 is a hardware block diagram of an opposing transceiver pair in accordance with an embodiment of the current invention.

FIG. 2 is a hardware block diagram of an opposing transceiver pair in accordance with an embodiment of the current invention. The first transceiver system includes a gateway 200 coupled to a communication network 100. The gateway handles the corresponding frametype for the communication network. A burst mode engine (BME) which may be realized as a digital signal processor or as a dedicated chip 218 couples the gateway to a plurality of analog front ends (AFE's) 212–214 and associated hybrid front ends (HFE's) 216–218. The subscriber lines 220–222 in binder 224 couple the first XDSL transceiver to a second XDSL transceiver. The second transceiver system includes a gateway 236 coupled to a communication network 238. The gateway handles the corresponding frametype for the communication network. A burst mode engine (BME) which may be realized as a digital signal processor or as a dedicated chip 234 couples the gateway to a plurality of analog front ends (AFE's) 230–232 and associated hybrid front ends (HFE's) 226–228. The subscriber lines 220–222 in binder 224 couple to the HFE's 226–228.

Figure 3:
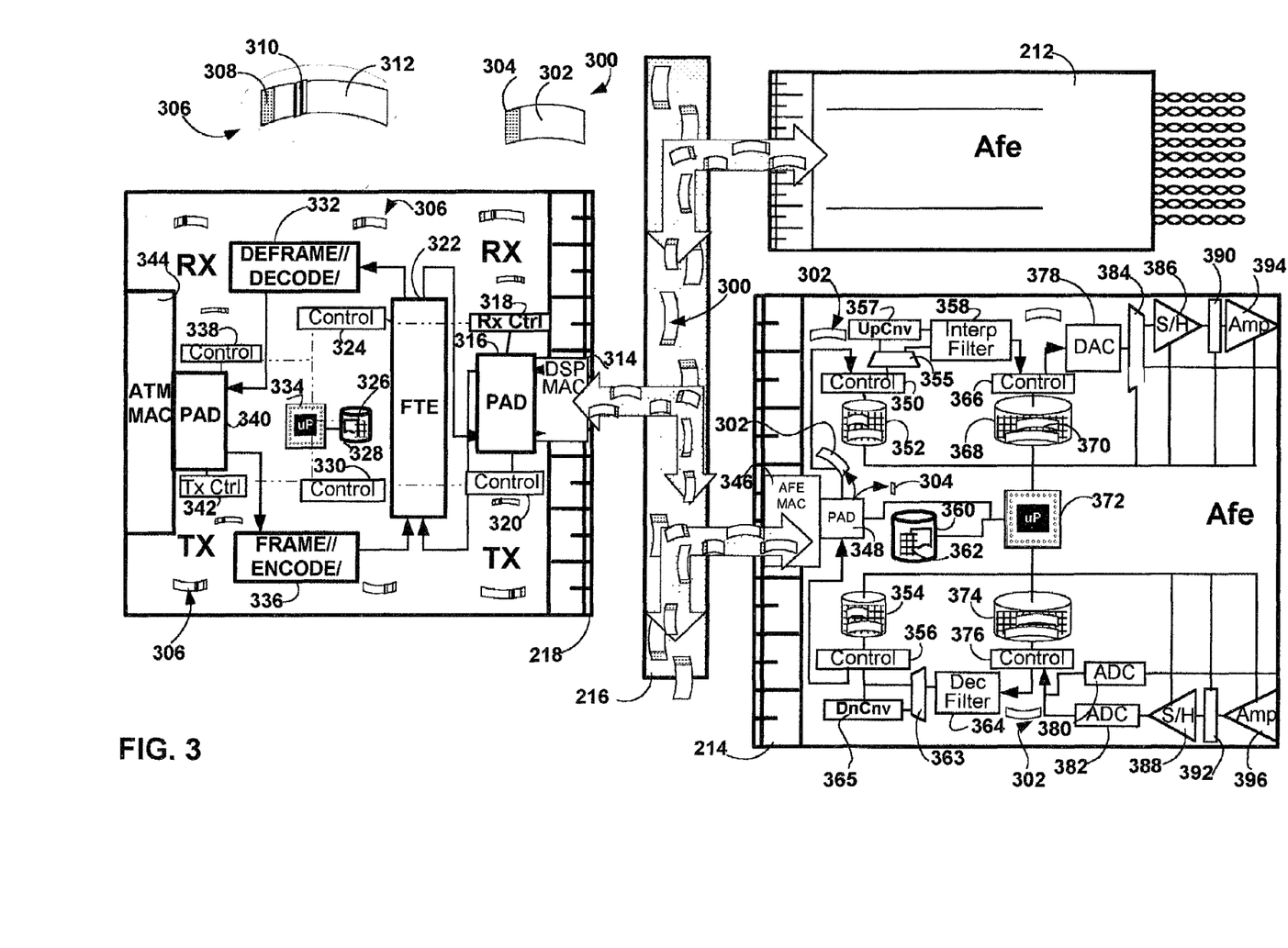
FIG. 3 is a detailed hardware block diagram of a transceiver system.

FIG. 3 is a chip level view of an embodiment of the invention in which multiple AFE's chips 212–214 connect with a DSP chip 218 across bus 216. They all may be mounted on the line card. Packets of raw data are shown being transported between the DSP and AFEs as well as within each DSP and AFE. Packet processing between the DSP and AFE chips involves transfer of bus packets 300. Packet processing within a DSP may involve device packets 306 (See FIG. 5). Packet processing within an AFE may involve raw data packets 302. These will be discussed in the following text.

These modules, AFE and DSP, may be found on a single universal line card. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The DSP chip 218 includes an upstream (receive) and a downstream (transmit) processing path with both discrete and shared modulation and demodulation modules. Selected ones of the modules are responsive to packet header information and/or control information to vary their processing of each packet to correspond with the X-DSL protocol and line code and channel which corresponds with the packet contents. Data for each of the channels is passed along either path in discrete packets the headers of which identify the corresponding channel and may additionally contain channel specific control instructions for various of the shared and discrete components along either the transmit or receive path.

On the upstream path, upstream packets containing digital data from various of the subscribers is received by the DSP medium access control (MAC) 314 which handles packet transfers to and from the DSP bus. The MAC couples with a packet assembler/disassembler (PAD) 316. The operation of the DSP PAD for upstream packets is managed by controller 318. For upstream packets, the PAD handles removal of the DSP bus packet header 304 and insertion of the device control headers 308–310 which are part of the device packet 306. (See FIG. 5). The content of these headers is generated by the core processor 334 using information downloaded from the DSLAM controller 200 (See FIG. 2) as well as statistics such as gain tables gathered by the de-framer 332, or embedded operations channel communications from the subscriber side. These channel specific and control parameters 326 are stored in memory 328 which is coupled to the core processor. The PAD 316 embeds the required commands generated by the core processor in the header or control portions of the device packet header of the upstream data packets. The upstream packets may collectively include data from multiple channels each implementing various of the X-DSL protocols. Thus the header of each device packet identifies the channel corresponding with the data contained therein. Additionally, a control portion of the packet may include specific control instructions for any of the discrete or shared components which make up the upstream or downstream processing paths. In the embodiment shown, the Fourier transform engine (FTE) 322 is a component which is shared between the upstream and downstream paths. Thus, on the upstream path each upstream packet is delivered to the FTE for demodulation. The input controller 330 handles the mapping of data and the processing of the packets as it flows through FTE. The information in the header of the packet is used by the controller 330 to maintain the channel identity of the data as it is demodulated, to setup the FTE at the appropriate parameters for that channel, e.g. sample size, and to provide channel specific instructions for the demodulation of the data. The demodulated data is passed under the control of output controller 324 as a packet to the next component in the upstream path, i.e. the deframer and Reed Solomon decoder 332 for further processing. This component reads the next device packet and processes the data in it in accordance with the instructions or parameters in its header. The demodulated, decoded and de-framed data is passed to the asynchronous transfer mode (ATM) PAD 340 operating under the control of controller 338. In the ATM PAD the device packet header is removed and the demodulated data contained therein is wrapped with an ATM header. The packet is then passed to the ATM MAC 344 for transmission of the ATM packet on the ATM network 100, 166 (See FIGS. 1–2).

On the downstream path, downstream packets containing digital data destined for various subscribers is received by the ATM MAC 344 which handles transfers to and from the ATM network. The ATM MAC passes each received packet to the ATM PAD 340 where the ATM header is removed and the downstream device packet 306 is assembled. The operation of the ATM PAD for downstream packets is managed by controller 342. Using header content generated by the core processor 334 the PAD assemble data from the ATM network into channel specific packets each with their own header, data and control portions. The downstream packets are then passed to the Framer and Reed Solomon encoder 336 where they are processed in a manner consistent with the control and header information contained therein. The Framer downstream packets are then passed to the input of the FTE. The control 330 governs the multiplexing of these downstream packets which will be modulated by the FTE with the upstream packets which will be demodulated therein. Each downstream packet with the modulated data contained therein is then passed to the DSP PAD which is managed by controller 320. In the DSP PAD the device packet header and control portions are removed, and a DSP bus header 304 is added. This header identifies the specific channel and may additionally identify the sending DSP, the target AFE, the packet length and such other information as may be needed to control the receipt and processing of the packet by the appropriate AFE. The packet is then passed to the DSP MAC for placement on the DSP bus 216 for transmission to the appropriate AFE.

FIG. 3 also shows a more detailed view of the processing of upstream and downstream packets within the AFE. In the embodiment of the invention shown, device packets are not utilized in the AFE. Instead, channel and protocol specific processing of each packet is implemented using control information for each channel stored in memory at session setup.

Downstream packets from the DSP are pulled off the bus 216 by the corresponding AFE MAC, e.g. MAC 346 on the basis of information contained in the header portion of that packet. The packet is passed to AFE PAD 348 which removes the header 304 and sends it to the core processor 372. The core processor matches the information in the header with channel control parameters 362 contained in memory 360. These control parameters may have been downloaded to the AFE at session setup. The raw data 302 portion of the downstream packet is passed to FIFO buffer 352 under the management of controller 350. Each channel has a memory mapped location in that buffer. For packets implementing a CAP line code multiplexer 355 switches the packet to the up converter 357. DMT line code packets are passed directly to the interpolator and filter 358 reads a fixed amount of data from each channel location in the FIFO buffer. The amount of data read varies for each channel depending on the bandwidth of the channel. The amount of data read during any given time interval is governed by the channel control parameters 362, discussed above. The interpolator upsamples the data and low pass filters it to reduce the noise introduced by the DSP. Implementing interpolation in the AFE as opposed to the DSP has the advantage of lowering the bandwidth requirements of the DSP bus 216. From the interpolator data is passed to the FIFO buffer 368 under the control of controller 366. The downstream packets 370 may increase in size as a result of the interpolation. The next module in the transmit pipeline is a DAC 378 which processes each channel in accordance with commands received from the core processor 372 using the control parameters downloaded to the control table 362 during channel setup. The analog output of the DAC is passed via analog mux 384 to a corresponding one of sample and hold devices 386. Each sample and hold is associated with a corresponding subscriber line. The sampled data is filtered in analog filters 390 and amplified by line amplifiers 394. The parameters for each of these devices, i.e. filter coefficients, amplifier gain etc. are controlled by the core processor using the above discussed control parameters 362. For example, where successive downstream packets carry downstream channels each of which implements different protocols, e.g. G.Lite, ADSL, and VDSL the sample rate of the analog mux 384 the filter parameters for the corresponding filter 390 and the gain of the corresponding analog amplifiers 394 will vary for each packet. This "on the fly" configurability allows a single downstream pipeline to be used for multiple concurrent protocols.

On the upstream path many of the same considerations apply. Individual subscriber lines couple to individual line amplifiers 396 through splitter and hybrids (not shown). Each channel is passed through analog filters 392, sample and hold modules 388 and dedicated ADC modules 380–382. As discussed above in connection with the downstream/transmit path, each of these components is configured on the fly for each new packet depending on the protocol associated with it. Each upstream packet is placed in a memory mapped location of FIFO memory 374 under the control of controller 376. From the controller fixed amounts of data for each channel, varying depending on the bandwidth of the channel, are processed by the decimator and filter module 364. The amount of data processed for each channel is determined in accordance with the parameters 362 stored in memory 360. Those parameters may be written to that table during the setup phase for each channel.

From the decimator and filter the raw DMT modulated data 302 is passed to FIFO buffer 354 which is controlled by controller 356. For CAP QAM modulated packets the multiplexer 363 switches the packets through the down converter 365 after which they also are passed to the FIFO buffer 354. Scheduled amounts of this data are moved to PAD 348 during each bus interval. The PAD wraps the raw data in a DSP header with channel ID and other information which allows the receiving DSP to properly process it. The upstream packet is placed on the bus by the AFE MAC 346. A number of protocols may be implemented on the bus 216. In an embodiment of the invention the DSP operates as a bus master governing the pace of upstream and downstream packet transfer and the AFE utilization of the bus.

Figure 4:
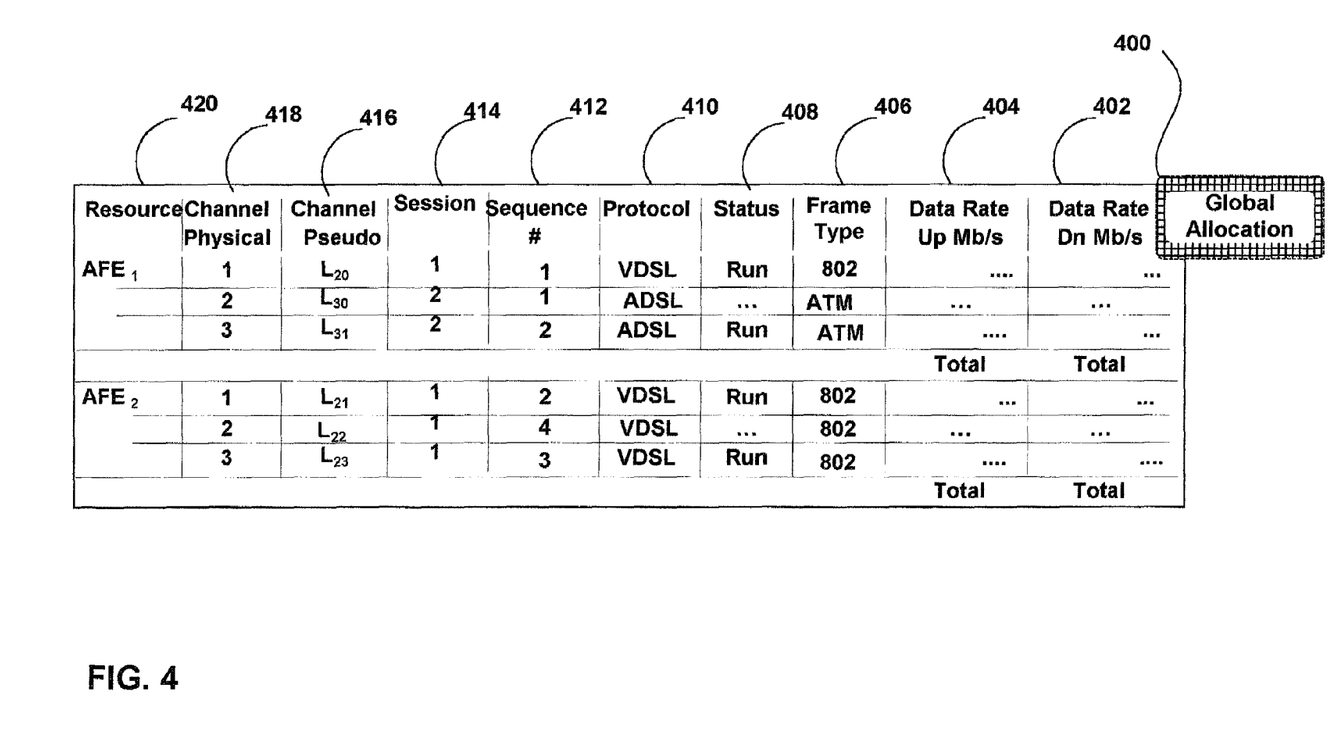
FIG. 4 shows a data structure associated with the provisioning of multiple sessions by the transceiver system shown in FIGS. 2–3.

FIG. 4 shows a data structure associated with the provisioning of multiple sessions by the transceiver system shown in FIGS. 2–3. The global allocation table 400 includes is resident on the main memory 326 of the associated BME 218 (See FIG. 3) The parameters stored in the table may be generated by the BME alone or downloaded by a DSLAM or other access controller at time of system startup. The table includes: data rate fields 402–404, frame type field 406, a status field 408, an XDSL protocol field 410, a sequence # field 412, a session field 414, a pseudo-channel field 416, a physical channel field 418 and a resource field 420. The subscriber lines associated with a session are allocated a pseudo-channel number to allow packet based communication with the BME. For each channel a corresponding session number is allocated to allow the framer on the transmit path and the deframer on the receive path to properly demultiplex and multiplex the pseudo channels of a session. A sequence number allows the orderly round robin symbol sequence for all the subscriber lines of each session to be established on both the sending and receiving systems.

Figure 5:
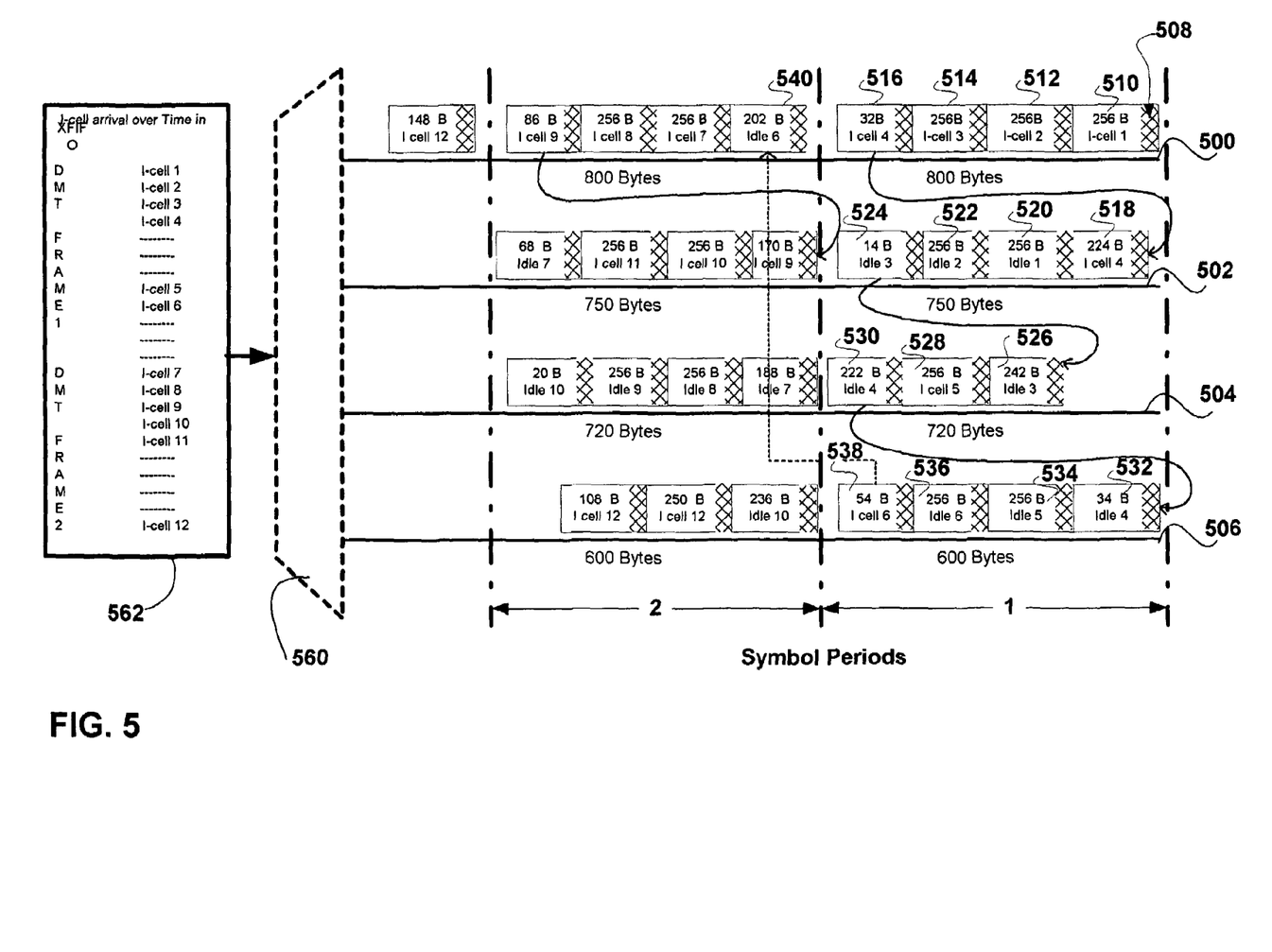
FIG. 5 shows the data structures associated with demultiplexing a packet based session across multiple subscriber lines on the transmit path of an associated one of the transceiver systems shown in FIGS. 2–3.

FIG. 5 shows the data structures associated with demultiplexing a packet based session across multiple subscriber lines links on the transmit path of an associated one of the transceiver systems shown in FIGS. 2–3. FIG. 5 shows the arrival of I-cells in the XFIFO 562 over a period of time starting with I-cell 1 and the framer processes 560 which picks up the data from the XFIFO and puts it into the DMT frame per symbol period for all the xDSL links 500, 502, 504 and 506. I-cell 1 510 with the header 508, I-cell 2 512, I-cell 3 514 and partial I-cell 4 516 constitutes the data for the link 1. The remainder of I-cell 4 518, Idle cell 1 520, Idle cell 2 522 and part of Idle cell 3 524 constitutes the data for the link 2. The remainder of Idle cell 3 526, I-cell 5 528 and part of Idle cell 4 530 constitutes the data for the link 3. The remainder of Idle cell 4 532, Idle cell 5 534, Idle cell 6 536 and part of I-cell 6 538 constitutes the data for the link 4. The remainder of Idle cell 6 will now go on link 1 during the symbol period 2.

All the links in a particular session are processed in a sequence order. Idle cells are inserted when there are no more I-cells in the XFIFO. During a symbol period, if there is room for only a partial cell, the rest of that particular cell (I-cell or the Idle cell) will be allocated to the next link in the sequence.

Figure 6:
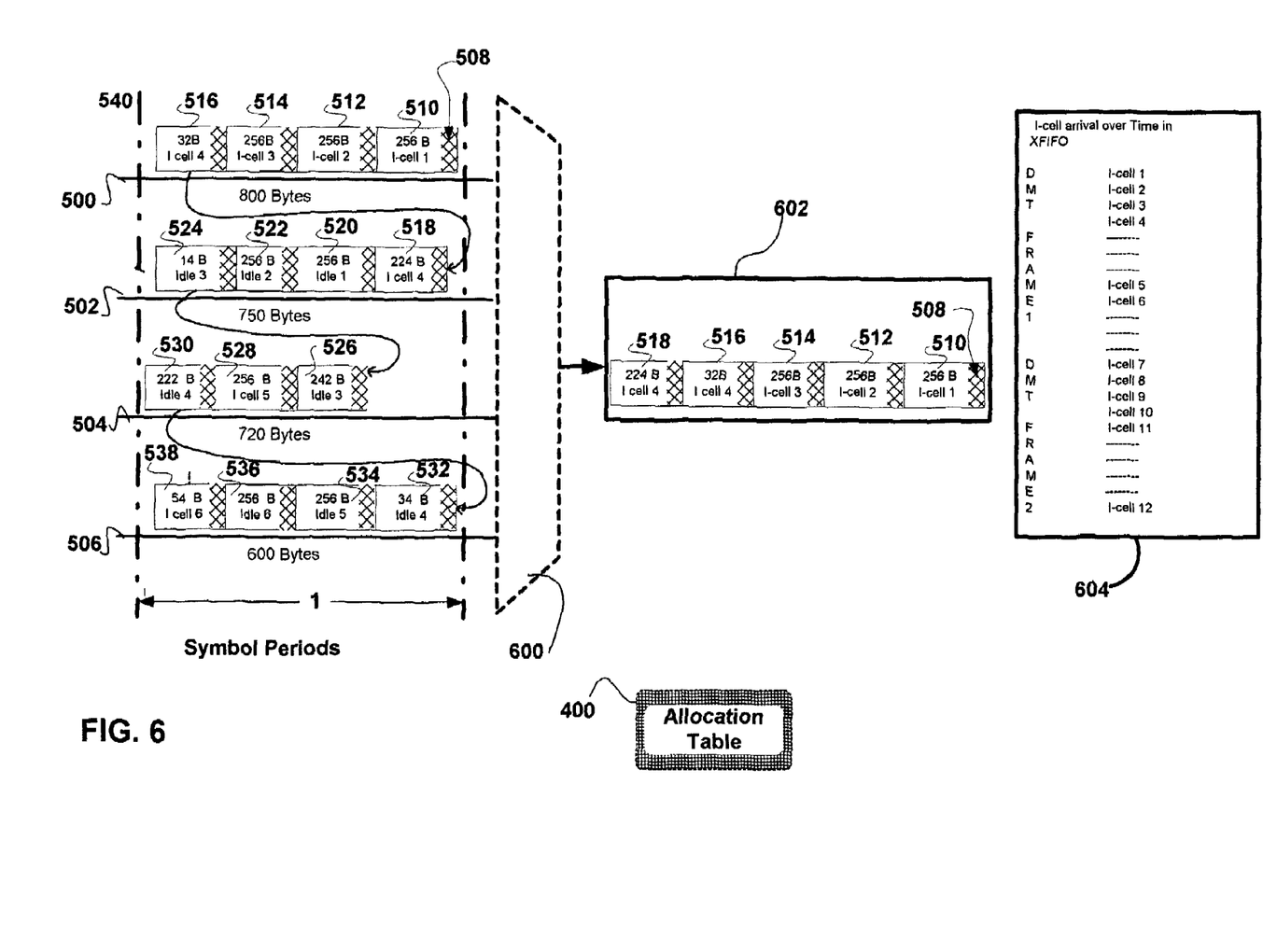
FIG. 6 shows the data structures associated with multiplexing a packet based session across multiple subscriber lines on the receive path of an associated one of the transceiver systems shown in FIGS. 2–3.

FIG. 6 shows the data structures associated with multiplexing a packet based session across multiple subscriber lines links on the receive path of an associated one of the transceiver systems shown in FIGS. 2–3. FIG. 6 shows the Deframer processes 600 where the data from the DMT frames on all the links in a particular session is extracted 602, cell delineation process done and the ATM cells are put into the CFIFO 604.

The Deframer drops the Idle cells in the process of extracting data from the DMT frames. Hence, only the valid I-cells will be queued in CFIFO to be sent to the gateway. The links in the session are processed in the same sequence as the transmitting side. As is evident from the FIG. 6, after the Deframer process, all the I-cells will be sequenced in the same order as on the transmitter side.

Figure 7:
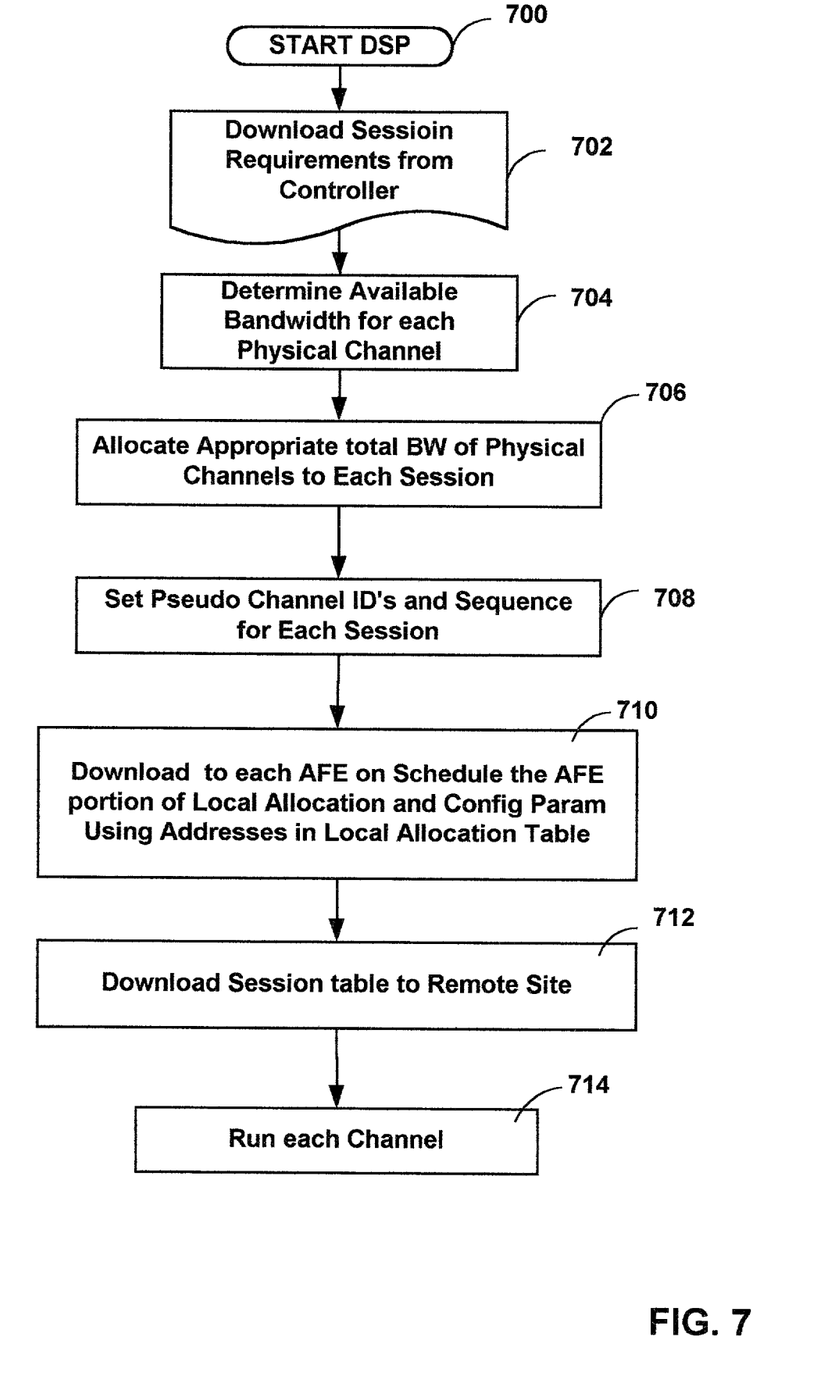
FIG. 7 is a process flow diagram of the processes associated with provisioning.

FIG. 7 is a process flow diagram of the processes associated with provisioning. In process 700 the system is initialized. Next in process 702 session parameters are downloaded. Then in process 704 the available bandwidth for each physical channel is determined. Then in process 706 the requested bandwidth for the associated session is allocated by the BME or a controller coupled thereto from among the available subscriber lines. Next in process 708 pseudo channel Ids and sequence numbers are assigned to various physical channels associated with each session. The information is then downloaded to the AFE in process 710 and to the remote in process 712. After provisioning all channels for each session are activated.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An XDSL communication system configured to couple to a plurality of subscriber lines, and the XDSL communication system comprising:
   an opposing pair of XDSL transceivers configured to communicate subscriber sessions across the plurality of subscriber lines and each including;
      a plurality of analog front ends (AFE) each configured to couple to corresponding ones of the plurality of subscriber lines for conversion of analog signals thereon;
      a digital signal processor (DSP) for modulation and demodulation of each of the subscriber sessions, and the DSP coupled to the plurality of AFE for packet switched communication therewith of packets each associated with a corresponding one of the subscriber sessions, and the DSP responsive to and including:
         an allocation table which allocates the subscriber sessions to corresponding ones of the plurality of subscriber lines and associated ones of the plurality of AFE based on bandwidth requirements of each of the subscriber sessions, and the allocation table configurable to include at least one session inverse multiplexed across at least two of the plurality of subscriber lines based on the bandwidth requirement thereof, whereby the entries in the allocation table govern the packet switched communication of the DSP with each of the plurality of AFE.

2. The XDSL communication system of claim 1, wherein the DSP further dynamically allocates a subscriber session to selected ones of the plurality of subscriber lines based on a bandwidth requirement thereof.

3. The XDSL communication system of claim 1, wherein further each of the opposing pair of XDSL transceivers couple to a corresponding one of a first packet based communication network and a second packet based communication network and transport the packets there between without altering an associated packet structure thereof.

4. The XDSL communication system of claim 1, wherein the associated packet type of at least one of the first and second packet based communication network comprises a selected one of:
   an 802.X packet type; and
   an ATM packet type.

5. The XDSL communication system of claim 1, wherein the DSP further comprises:
   a plurality of shared and discrete modules supporting packet based communications with one another of data associated with each of the subscriber sessions and coupled to one another to form a transmit path and a receive path for modulation and demodulation of each subscriber session onto the corresponding ones of the plurality of subscriber lines as allocated in the allocation table.

6. The XDSL communication system of claim 1, wherein the opposing pair of XDSL transceivers further comprise:
   the DSP associated with a first of the pair of opposing XDSL transceivers configured to download the allocation table to the DSP associated with a second of the pair of opposing XDSL transceivers; and
   the DSP associated with the second of the pair of opposing XDSL transceivers configured to re-allocate subscriber sessions to corresponding ones of the plurality of subscriber lines and associated ones of the plurality of AFE based on the downloaded allocation table.

* * * * *